United States Patent
Takagi

(10) Patent No.: US 10,244,156 B2
(45) Date of Patent: Mar. 26, 2019

(54) IMAGING APPARATUS, METHOD OF DISPLAYING INFORMATION, AND INFORMATION PROCESSING CIRCUIT HAVING A FOCUSING FUNCTION

(71) Applicant: SONY CORPORATION, Tokyo (JP)

(72) Inventor: Yoshimitsu Takagi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 164 days.

(21) Appl. No.: 14/302,812

(22) Filed: Jun. 12, 2014

(65) Prior Publication Data

US 2014/0375871 A1  Dec. 25, 2014

(30) Foreign Application Priority Data

Jun. 20, 2013  (JP) ................................ 2013-129480

(51) Int. Cl.
  *H04N 5/232*  (2006.01)
(52) U.S. Cl.
  CPC ..... *H04N 5/23212* (2013.01); *H04N 5/23293* (2013.01)
(58) Field of Classification Search
  CPC .................. H04N 5/23212; H04N 5/23293
  USPC ............. 348/345–357, 333.01–333.12
  See application file for complete search history.

(56) References Cited

U.S. PATENT DOCUMENTS

| | | | | |
|---|---|---|---|---|
| 2004/0218086 A1* | 11/2004 | Voss | ........... | H04N 5/23212 348/345 |
| 2006/0028579 A1* | 2/2006 | Sato | ........... | H04N 5/23212 348/362 |
| 2007/0009251 A1* | 1/2007 | Koskinen | ........... | G03B 13/18 396/147 |
| 2008/0074531 A1* | 3/2008 | Ide | ........... | G03B 3/00 348/346 |
| 2009/0102960 A1 | 4/2009 | Tsuchiya | | |
| 2009/0268080 A1* | 10/2009 | Song | ........... | H04N 5/23212 348/349 |
| 2012/0050604 A1* | 3/2012 | Hamada | ........... | G02B 7/36 348/349 |
| 2012/0057062 A1* | 3/2012 | Hamada | ........... | G02B 7/102 348/333.02 |

(Continued)

FOREIGN PATENT DOCUMENTS

| | | |
|---|---|---|
| CN | 101303510 A | 11/2008 |
| CN | 101584205 A | 11/2009 |

OTHER PUBLICATIONS

Office Action for CN Patent Application No. 201410264084.X, dated Jul. 21, 2017, 28 pages of Office Action and 19 pages of English Translation.

*Primary Examiner* — Sinh Tran
*Assistant Examiner* — Selam T Gebriel
(74) *Attorney, Agent, or Firm* — Chip Law Group

(57) ABSTRACT

An imaging apparatus includes: an imaging section having a focusing function, the imaging section being configured to generate a shooting image based on a subject and to output the generated shooting image; a calculation section configured to calculate a variation amount of focus level of the shooting image generated by the imaging section; and a display control section configured to allow a shooting image screen based on the shooting image and to allow information in accordance with the variation amount of the focus level calculated by the calculation section to be displayed on a display section.

19 Claims, 10 Drawing Sheets

(56) References Cited

U.S. PATENT DOCUMENTS

| | | | | |
|---|---|---|---|---|
| 2012/0314116 A1* | 12/2012 | Jannard | ................ | G03B 13/18 |
| | | | | 348/333.02 |
| 2013/0300895 A1* | 11/2013 | Kawarada | .......... | H04N 5/23212 |
| | | | | 348/229.1 |
| 2013/0307993 A1* | 11/2013 | Kawarada | .......... | H04N 5/23219 |
| | | | | 348/169 |
| 2014/0198242 A1* | 7/2014 | Weng | ................ | H04N 5/23293 |
| | | | | 348/333.09 |

* cited by examiner

IMAGING APPARATUS, METHOD OF DISPLAYING INFORMATION, AND INFORMATION PROCESSING CIRCUIT HAVING A FOCUSING FUNCTION

CROSS REFERENCE TO RELATED APPLICATIONS

This application claims the benefit of Japanese Priority Patent Application JP 2013-129480 filed Jun. 20, 2013, the entire contents of each which are incorporated herein by reference.

BACKGROUND

The present disclosure relates to an imaging apparatus having a focusing function, to a method of displaying information in such an imaging apparatus, and to an information processing unit applicable to such an imaging apparatus.

Focusing methods in an imaging apparatus are classified into an automatic focusing method and a manual focusing method. In the automatic focusing method, the apparatus automatically performs a focus adjustment operation. In the manual focusing method, a user operates a part such as a focus ring and manually performs the focus adjustment operation. In a case of the manual focusing method, a user is allowed to perform a desirable focus adjustment operation by referring to some focus information displayed on a monitor or a finder. Examples of a method of displaying the focus information in the case of the manual focusing method are disclosed in Japanese Unexamined Patent Application Publication Nos. 2009-44757 (JP2009-44757A) and 2005-223780 (JP2005-223780A).

SUMMARY

In recent years, size and the number of pixels of an image sensor have been increased. Accordingly, a difference in resolution has been increased between a recorded image and a monitor image or a finder image. Therefore, in a case of shooting in a manual focusing mode, although a user thinks that a targeted part is in focus when seeing an image on a small monitor or finder, the expected part is often not in focus when confirming the shooting image in a large screen such as a television or a PC.

JP2009-44757A proposes a method of extracting an edge with the use of a component such as a Sobel filter and of displaying information of the edge as focus information to be overlapped on an original image. However, in this method, it is difficult to capture time-series variation in focus level, and the original image is hidden by the edge information. Therefore, it is difficult to finally adjust the focus.

JP2005-223780A proposes a method of displaying, as focus information, a focus level in a designated region in a bar graph or in a line graph, and thereby, easily comprehending time-series variation in the focus information. However, JP2005-223780A also discloses that discontinuous points are present in the graph under influence of display level adjustment.

Therefore, it is not necessarily an effective assist function for the manual focusing operation to perform the focus adjustment operation while seeing the graph. Moreover, the operation is performed while comparing the shooting image and the graph. Therefore, a user needs to move his or her sight, and accordingly, it may be difficult to finally adjust the focus. Further, JP2005-223780A proposes to determine that a focused state is achieved when an evaluation value becomes the same as a maximum value again which has been once passed by the evaluation value, and to perform automatic shooting operation at that time. However, taking into consideration factors such as variation in a subject and influence of a shake of a hand, a possibility of obtaining a desirably-focused image is low when an image is shot under the condition that the evaluation value has met the maximum value in the past.

It is desirable to provide an imaging apparatus, a method of displaying information, and an information processing unit that are capable of easily comprehending a focus state and of easily obtaining a favorable shooting image.

According to an embodiment of the present disclosure, there is provided an imaging apparatus including: an imaging section having a focusing function, the imaging section being configured to generate a shooting image based on a subject and to output the generated shooting image; a calculation section configured to calculate a variation amount of focus level of the shooting image generated by the imaging section; and a display control section configured to allow a shooting image screen based on the shooting image and to allow information in accordance with the variation amount of the focus level calculated by the calculation section to be displayed on a display section.

According to an embodiment of the present disclosure, there is provided a method of displaying information, the method including: calculating a variation amount of focus level of a shooting image generated by an imaging section having a focusing function; and allowing a shooting image screen based on the shooting image and allowing information in accordance with the calculated variation amount of the focus level to be displayed on a display section.

According to an embodiment of the present disclosure, there is provided an information processing unit including: a calculation section configured to calculate a variation amount of focus level of a shooting image generated by an imaging section having a focusing function; and a display control section configured to allow a shooting image screen based on the shooting image and to allow information in accordance with the variation amount of the focus level calculated by the calculation section to be displayed on a display section.

In the imaging apparatus, the method of displaying information, and the information processing unit according to the embodiments of the present disclosure, the information in accordance with the variation amount of the focus level of the shooting image is displayed on the display section together with the shooting image screen.

According to the imaging apparatus, the method of displaying information, and the information processing unit of the embodiments of the present disclosure, the information in accordance with the variation amount of the focus level of the shooting image is displayed on the display section together with the shooting image screen. Therefore, it is possible to easily comprehend the focus state and to easily obtain a favorable shooting image.

It is to be noted that the effects disclosed in the present description are mere examples. The effects of the present disclosure are not limited thereto, and may include additional effects.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
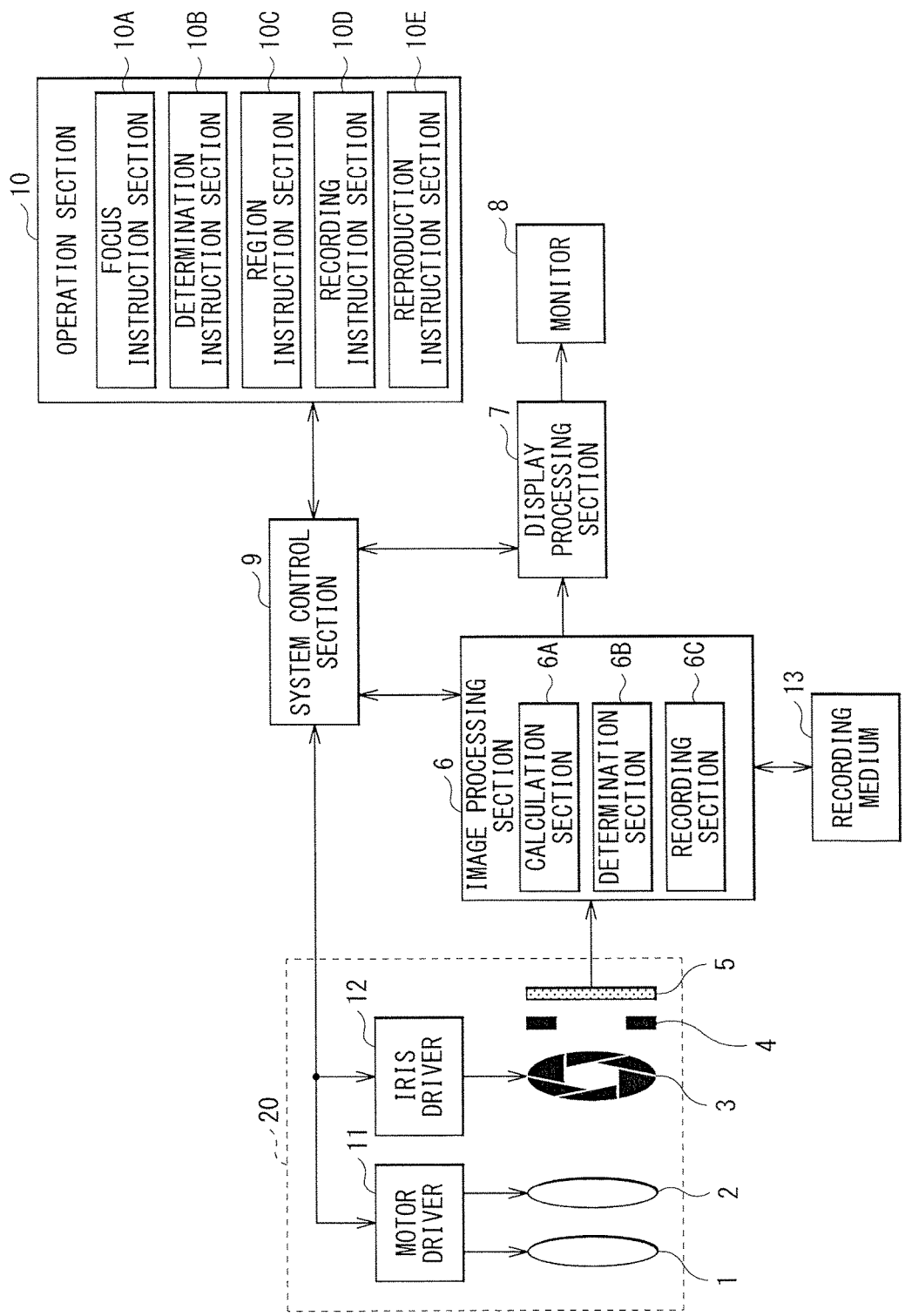
FIG. 1 is a block diagram illustrating a configuration example of an imaging apparatus according to an embodiment of the present disclosure.

An embodiment of the present disclosure will be described below in detail referring to the drawings. The description will be provided in the following order:
1. Configuration of Imaging Apparatus
2. Operation of Imaging Apparatus
  2-1. Outline of Shooting Operation
  2-2. Outline of Focus Adjustment Operation in Automatic Focus Shooting Mode
  2-3. Method of Displaying Focus Information in Manual Focus Shooting Mode
  2-4. Automatic Shooting in Manual Focus Shooting Mode
  2-5. Method of Displaying Shooting Image
3. Effects of Imaging Apparatus
4. Other Embodiments

[1. Configuration of Imaging Apparatus]

As shown in FIG. 1, an imaging apparatus includes an image processing section 6, a display processing section 7, a monitor 8, a system control section 9, an operation section 10, a recording medium 13, and an imaging section 20.

The imaging section 20 has a focusing function. The imaging section 20 generates data of a shooting image based on a subject, and outputs the generated data. The imaging section 20 includes a zoom lens 1, a focus lens 2, an iris 3, a mechanical shutter 4, an imaging device 5, a motor driver 11, and an iris driver 12. The zoom lens 1 and the focus lens 2 configure an imaging optical system that forms an optical image of the subject shot by the imaging device 5. The focusing function is achievable by driving the focus lens 2 by the motor driver 11. The imaging device 5 outputs, as data of the shooting image, an electric signal based on the optical image formed on an imaging plane by the zoom lens 1 and the focus lens 2. The imaging device 5 may be configured of a solid-state imaging device such as a CMOS (Complementary Metal-Oxide Semiconductor) and a CCD (Charge Coupled Device).

The image processing section 6 includes a calculation section 6A, a determination section 6B, and a recording section 6C. The operation section 10 includes a focus instruction section 10A, a determination instruction section 10B, a region instruction section 10C, a recording instruction section 10D, and a reproduction instruction section 10E.

The image processing section 6 performs various signal processes on the electric signal supplied from the imaging device 5, and generates digital data of the shooting image. The image processing section 6 also performs various signal processes to convert the data of the shooting image into image data suitable for being recorded in a recording medium 13, and outputs such image data. The display processing section 7 performs various signal processes to convert the data of the shooting image into image data suitable for being displayed on the monitor 8, and outputs such image data. The display processing section 7 also converts data of various information related to operation menu, shooting, etc. into image data suitable for being displayed on the monitor 8, and outputs such image data.

The recording section 6C records, in the recording media 13, the image data obtained by shooting in various recording media 13. The monitor 8 displays various types of information related to the operation menu, shooting, etc. of the imaging apparatus. The monitor 8 reproduces and displays the image data recorded in the recording medium 13 in a reproduction mode. The monitor 8 also displays in live an image under current shooting in a live view mode.

The operation section 10 includes components such as a release button and various operation dials. The operation section 10 supplies various operation signals to the system control section 9 based on content of the user's operation. The system control section 9 totally controls the respective sections in the imaging apparatus. The system control section 9 totally controls the respective sections based on instruction supplied from the operation section 10 or based on a control program set in advance.

Figure 5:
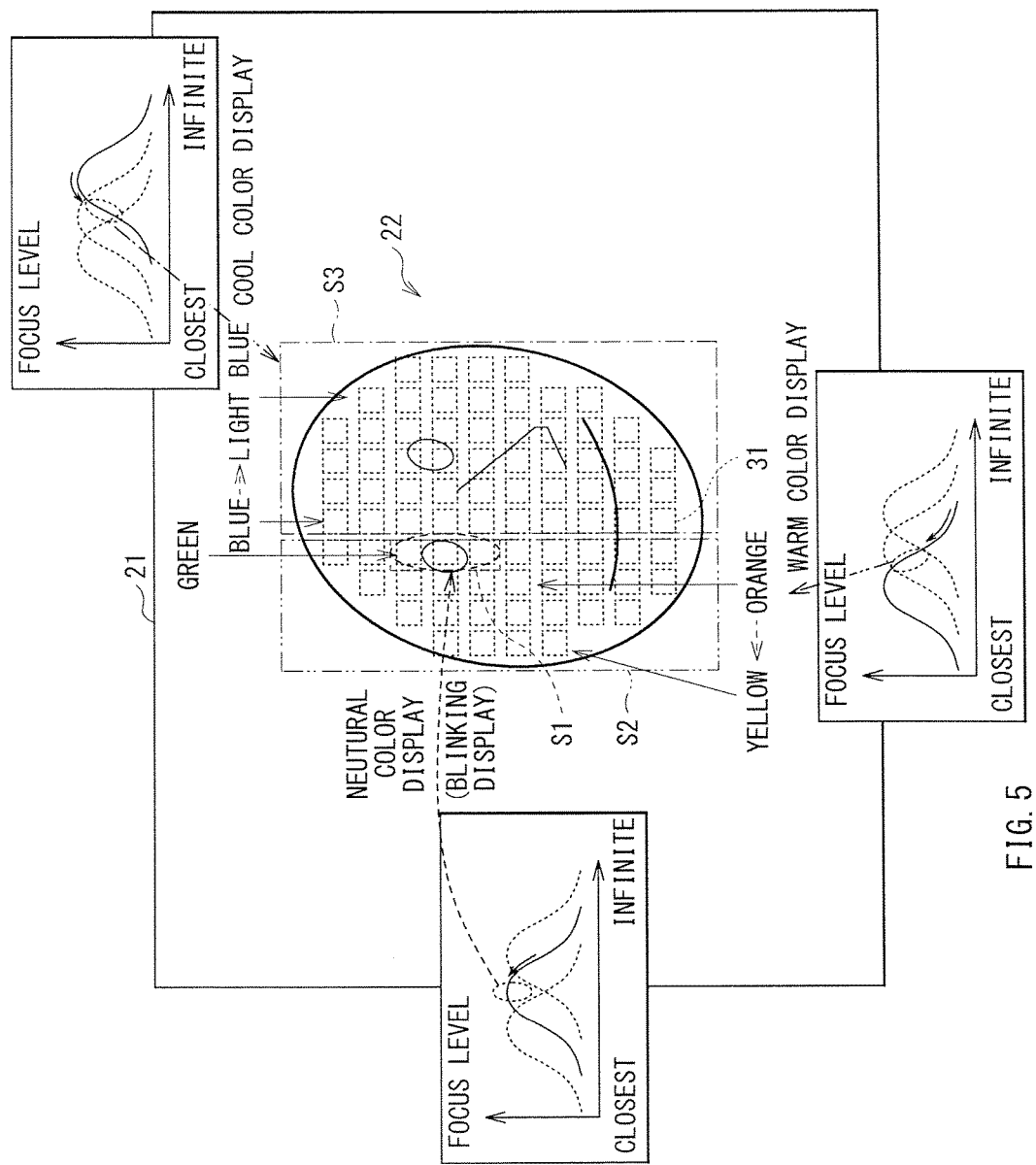
FIG. 5 is an explanation diagram illustrating an example of display of information in accordance with a variation amount of focus level.

The display processing section 7 serves as a display control section that allows a shooting image screen based on the shooting image and information in accordance with a variation amount of focus level calculated by the calculation section 6A to be displayed on the monitor 8. The display processing section 7 may allow, for example, a shooting image screen 21 shown in FIG. 2 to be displayed on the monitor 8. An image of a subject 22 being shot by the imaging section 20 is displayed as a shooting image in the shooting image screen 21. The display processing section 7 also allows display of information in accordance with the variation amount of the focus level calculated by the calculation section 6A in the image processing section 6 to be displayed in the shooting image screen 21 on the monitor 8. The display of the information in accordance with the variation amount of the focus level may be displayed, for example, as shown in FIGS. 3 and 5 which will be described later in the manual shooting mode.

The calculation section 6A divides part or all of a region of the shooting image into a plurality of regions, and calculates the variation amount of the focus level for each of the plurality of regions, in the manual shooting mode. The display processing section 7 allows the information in accordance with the variation amounts of the focus level for the respective plurality of regions to be displayed on the monitor 8 in the manual shooting mode. For example, as shown in FIG. 3, the display processing section 7 allows the monitor 8 to perform display with the use of frames that present a plurality of regions (segments 31) in the shooting image screen 21 in the manual shooting mode. For example, as shown in FIG. 5 which will be described later, the display processing section 7 also allows a display state of the display with the use of frames to vary in accordance with the variation amount of the focus level.

The focus instruction section 10A instructs the imaging section 20 to perform a focus adjustment operation in the manual shooting mode. The calculation section 6A may reset calculation of the variation amount of the focus level when an adjustment amount per unit time of the focus adjustment operation instructed by the focus instruction section 10A is equal to or larger than a predetermined value (when precipitous focus adjustment operation is performed). When the calculation of the variation amount of the focus level has been reset, the display processing section 7 may allow the monitor 8 to perform display that notifies such a state. The display that notifies such a state may be a notification 32 shown in FIG. 6, for example, which will be described later. The display processing section 7 may not allow the information based on the variation amount of the focus level to be displayed when the variation amount of the focus level is equal to or smaller than a first threshold for a predetermined period or more (when the focus level has not been varied for a certain period).

Figure 7:
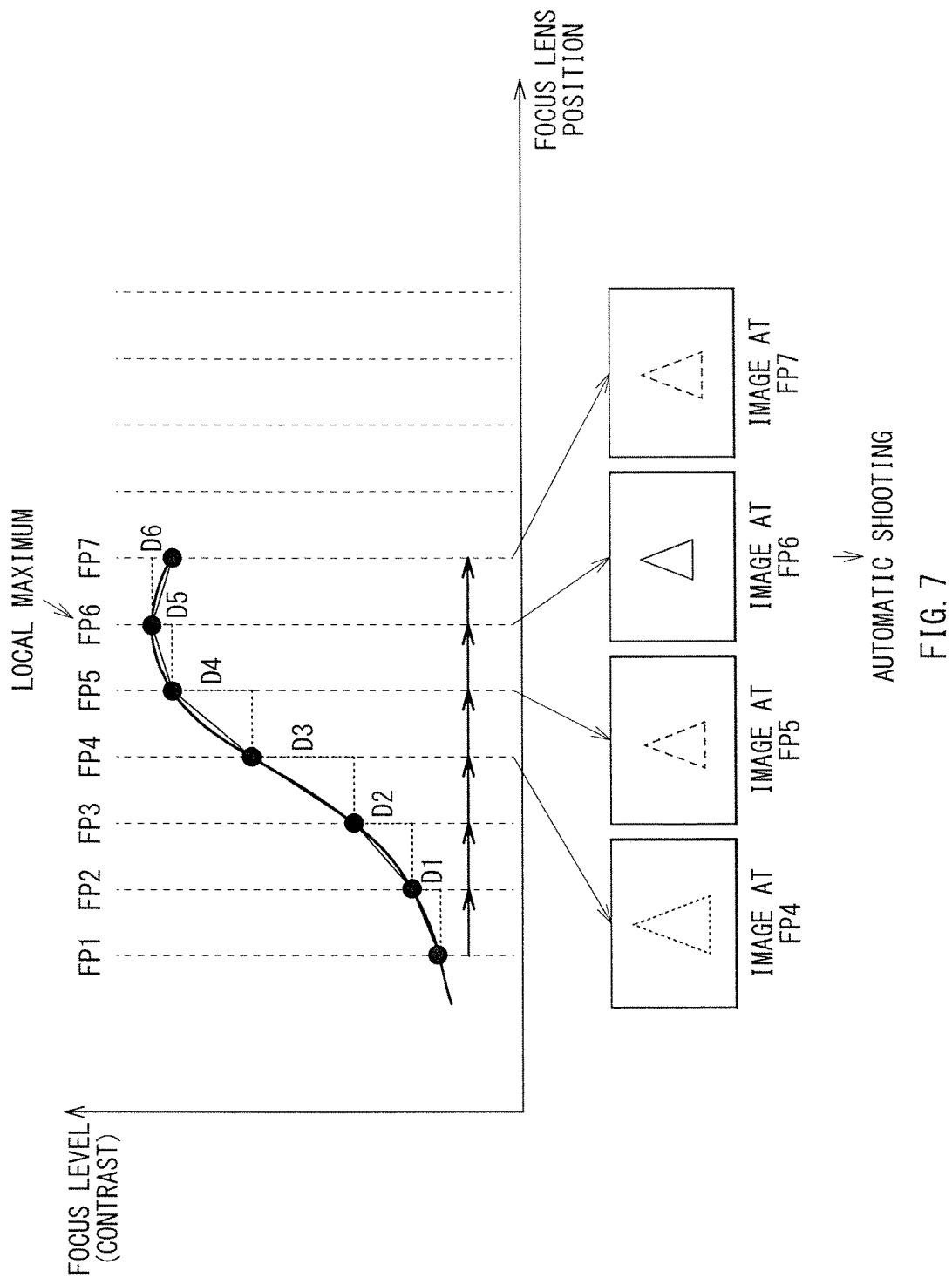
FIG. 7 is an explanation diagram illustrating a first example of a relationship between a position of a focus lens and the variation amount of the focus level.

The determination section 6B determines a local maximum value of the focus level based on the variation amount of the focus level in the manual shooting mode. When the determination section 6B determines the local maximum value of the focus level, the recording section 6C may perform an automatic recording operation of the shooting image in the recording medium 13 in the manual shooting mode. When the recording section 6C performs the automatic recording operation, the display processing section 7 may allow the monitor 8 to perform display that notifies such a state. When the variation amount of the focus level is equal to or larger than a second threshold, the recording section 6C may not perform the automatic recording operation of the shooting image. In this example, the maximum value may be determined, for example, as shown in FIG. 7 which will be described later. The case where the variation amount of the focus level is equal to or larger than the second threshold may refer to, for example, a case shown in FIG. 8 which will be described later.

The determination instruction section 10B is for instructing a reference value of the variation amount of the focus level used to determine the local maximum value in the determination section 6B in the manual shooting mode. The determination section 6B may change the reference value used to determine the local maximum value based on instruction supplied by the determination instruction section 10B.

The region instruction section 10C designates, in the shooting image screen 21, a determination region in which the local maximum value of the focus level is determined, in the manual shooting mode. The determination section 6B may determine the local maximum value of the focus level based on the variation amount of the focus level in the determination region designated by the region instruction section 10C.

Figure 9:
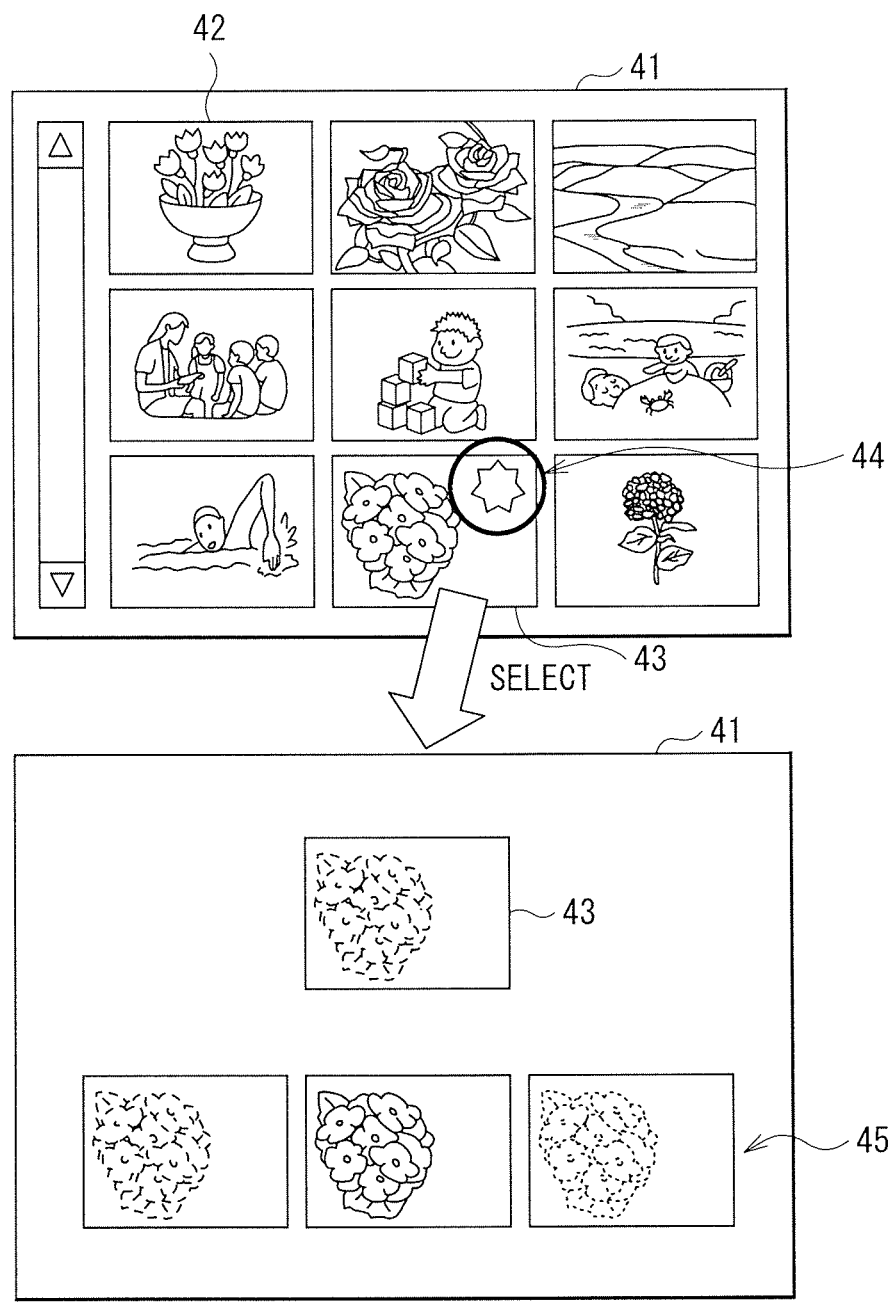
FIG. 9 is an explanation diagram illustrating an example of a reproduction image screen.

The recording instruction section 10D is for instructing recording of the shooting image in the recording medium 13 in the manual shooting mode. The recording section 6C may associate one or more first shooting images with one or more second shooting images based on times when the first and second shooting images have been recorded. The first shooting image is recorded based on instruction from the recording instruction section 10D. The second shooting image is recorded automatically. In this example, the first shooting image may be, for example, a user shooting image 43 as shown in FIG. 9 which will be described later. The second shooting image may be, for example, an automatic shooting image 45 as shown in FIG. 9 which will be described later.

The reproduction instruction section 10E allows either or both of the first and second shooting images recorded in the recording medium 13 to be reproduced and displayed on the monitor 8. In a case where the first shooting image instructed by the reproduction instruction section 10E is reproduced and displayed on the monitor 8, when the second shooting image associated with the first shooting image exists, the display processing section 7 may allow the monitor 8 to perform display that notifies such a state. In this example, the display that notifies such a state may be, for example, an icon 44 shown in FIG. 9 which will be described later.

[2. Operation of Imaging Apparatus]
[2-1. Outline of Shooting Operation]

An amount of light from the subject that has passed through the zoom lens 1 and the focus lens 2 is adjusted by the iris 3. Thereafter, such light forms an image on a plane of the imaging device 5. During the shooting, the system control section 9 detects that the shutter button in the operation section 10 is pressed down, and closes the mechanical shutter 4 after a predetermined time has elapsed. Thus, exposure is completed.

Subsequently, the electric signal obtained by photoelectric conversion by the imaging device 5 is outputted as data of the shooting image to the image processing section 6. The image processing section 6 performs, on the inputted data of the shooting image, signal processes such as a demosaic process, adjustment of gradation and tone, a noise reduction process, and size conversion. The image processing section 6 may further converts the data of the shooting image into compressed image file such as JPEG, and then stores the compressed image file in the recording medium 13. Moreover, the data of the shooting image outputted from the image processing section 6 is composited with various information related to operation icons, shooting, etc. in the display processing section 7, and the composited image is displayed on the monitor 8.

The system control section 9 supplies necessary driving instruction to the zoom lens 1, the focus lens 2, and the iris 3 based on the user's operation with the use of a zoom lever, dials, etc. in the operation section 10, and thereby, an angle of view, focus, an amount of light, etc. are adjusted. It is to be noted that, in the present embodiment, there is shown an example in which the operations of the zoom lens 1 and the focus lens 2 are electrically driven by a motor. However, for example, in a case of a camera with interchangeable lenses, the zoom lens 1 and the focus lens 2 may be mechanically driven by a mechanism on the lens side without using the motor.

[2-2. Outline of Focus Adjustment Operation in Automatic Focus Shooting Mode]

Figure 2:
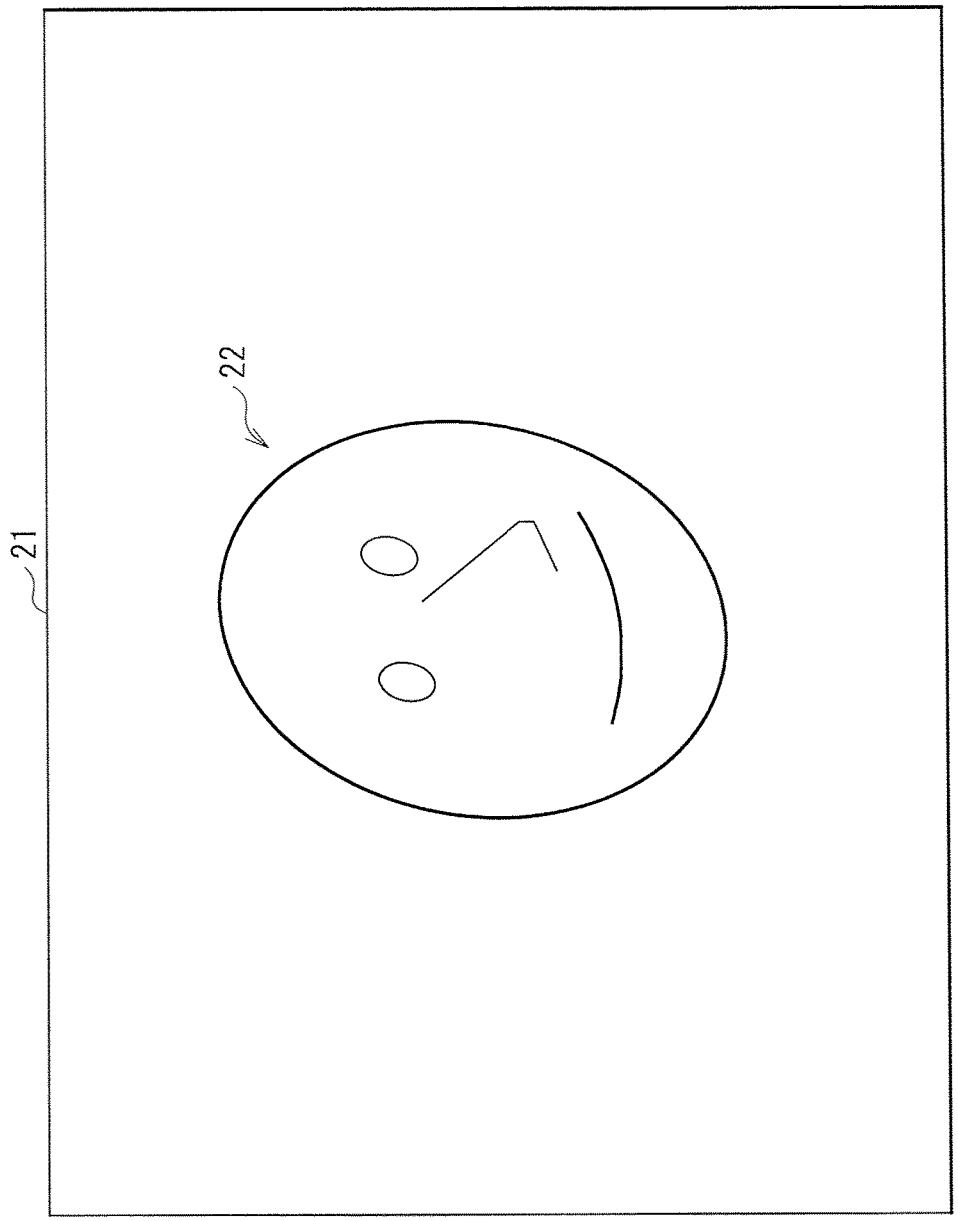
FIG. 2 is an explanation diagram illustrating an example of a shooting image screen.
Figure 3:
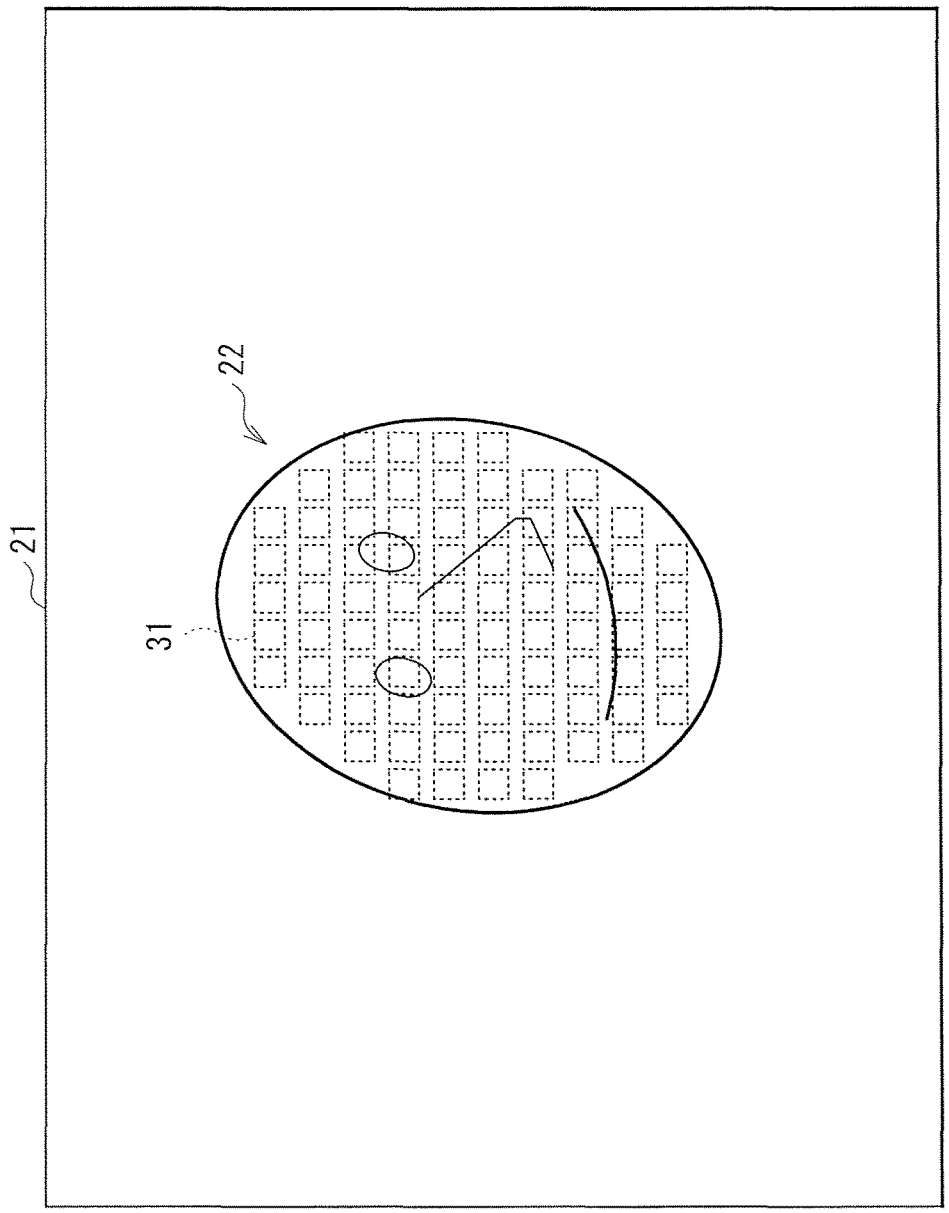
FIG. 3 is an explanation diagram illustrating an example of a state in which frame-like segments are displayed in the shooting image screen.
Figure 4:
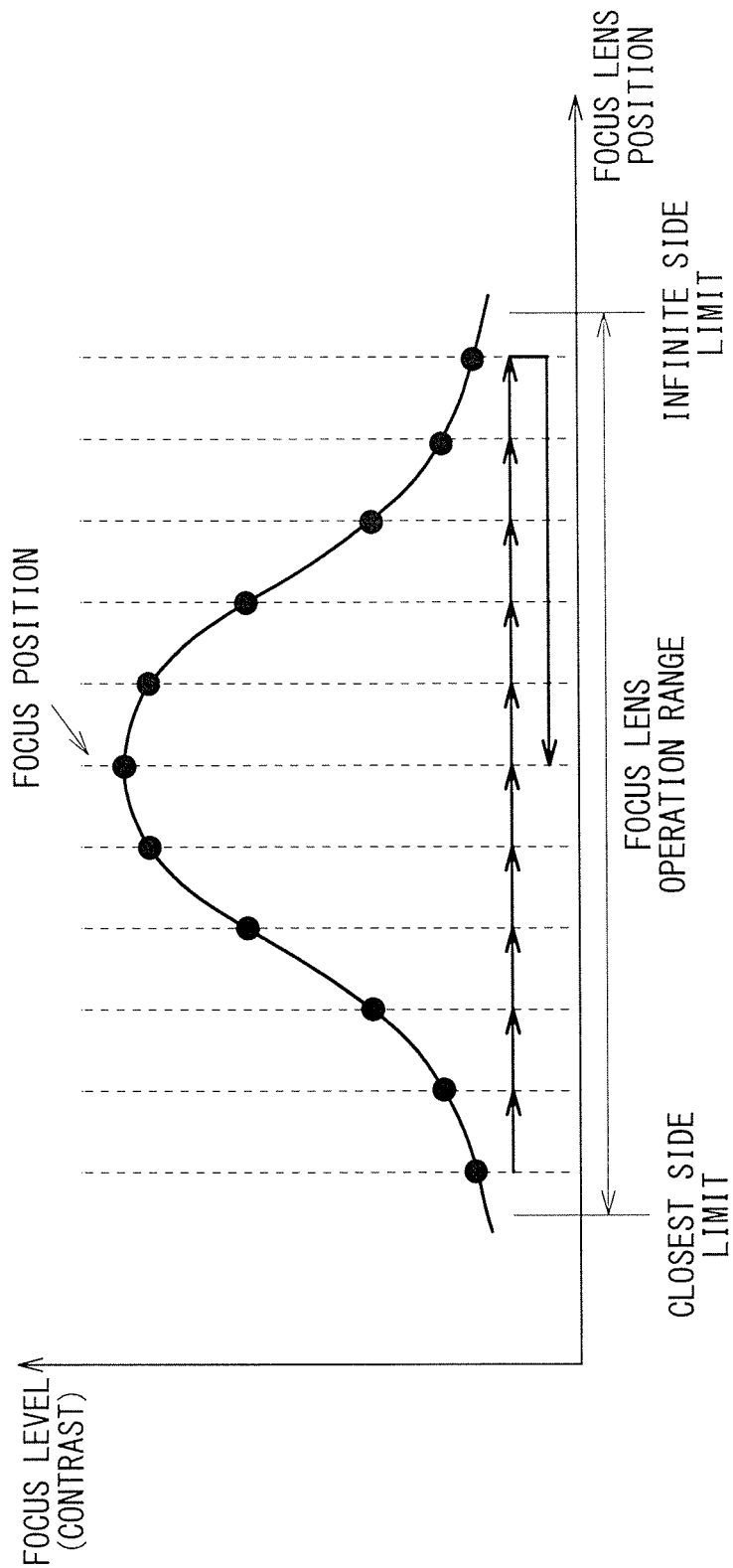
FIG. 4 is an explanation diagram illustrating outline of shooting in an automatic focusing mode.

In the automatic focus shooting mode, while the focusing lens 2 is automatically allowed to travel, the image processing section 6 continues to detect the focus level (contrast) in a specific region in the shooting image screen 21 as shown in FIG. 2, for example. Further, a position of the focus lens 2 in which the focus level is the highest is searched. FIG. 4 shows a relationship between the variation in the focus level and the position of the focus lens 2 in this case. In FIG. 4, a vertical axis represents the focus level (contrast), and a horizontal axis represents the position of the focus lens 2. As shown in FIG. 4, the focus level may be searched, for example, from a closest side to an infinite side in a range adjustable by the focus lens 2.

[2-3. Method of Displaying Focus Information in Manual Focus Shooting Mode]

Generally, in the manual focus shooting mode, a user manually allows the focus lens 2 to travel with the use of the focus ring or the operation dials on the main body of the camera, and the user himself or herself searches an optimum focus position while confirming a blur state of the shooting image referring to an image displayed on the monitor 8.

In the present embodiment, the calculation section 6A in the image processing section 6 divides the shooting image into a plurality of regions, and continues to calculate the variation amount of the focus level in each region in background also in the manual focus shooting mode. The display processing section 7 assists the user's focus adjustment operation by allowing the monitor 8 to perform display in accordance with the calculated variation amount. The monitor 8 performs display based not on the focus level itself, but based on, for example, speed of variation, direction of variation (increase and decrease in level), etc. of the focus level as the variation amount of the focus level. This calculation of the variation amount of the focus level is performed in association with the traveling of the focus lens 2. The calculation of the variation amount of the focus level is stopped when the user stops the focus adjustment operation (instruction by the focus instruction section 10A).

To give a specific example, description will be provided of a case where a human face is to be shot as the subject 22 as shown in FIG. 2. In the manual focus shooting mode, the display processing section 7 may allow, for example, display with the use of frames to be performed that presents a plurality of regions (segments 31) in the shooting image screen 21 as shown in FIG. 3. It is to be noted that, in FIG. 3, the display with the use of frames is performed only in a portion of the subject 22. However, the display with the use of frames may be performed on the entire screen. The calculation section 6A calculates the variation amount of the focus level on a segment 31 unit basis.

In the monitor 8, display of the information in accordance with the variation amount of the focus level is performed by changing a color of the frames or by allowing the frame to blink on a segment 31 unit basis. FIG. 5 shows a specific example of this display of the information. It is to be noted that a display method described in this example may be used in a still image shooting mode or may be used in a moving image shooting mode.

FIG. 5 illustrates a display example at a timing when the focus lens 2 has traveled from the infinite side to the closest side and a focus level of a segment S1 near a right eye of the subject 22 is at the local maximum. By changing the color of the frame to be displayed in a neutral color, for example, by switching the color of the frame to green, at a moment when the focus level of the segment S1 near the right eye has become the local maximum, it is notified to the user that that region is in an optimum focus state. Further, by allowing the frame to blink at that timing, it is also possible to more effectively notify the optimum focus state. By expressing such a state by changing the color of the frame or by allowing the frame to blink, not the entire region inside the segments 31 is hidden. Therefore, it is possible to confirm the blur state of the subject 22 at the same time.

A frame of a segment S2 in which the focus level is increasing may be displayed, for example, in a warm color. Further, by varying strength of the color of the frame displayed in the warm color in accordance with a variation rate of the focus level, it is possible to comprehend at a glance the state of the variation rate of the focus level. For example, in a region in which a portion where the focus level is increasing is near the local maximum, the frame may be displayed in orange. For example, in a region in which a portion where the focus level is increasing is farther from the local maximum, the color of the frame may be changed to light orange or yellow.

On the other hand, a frame of a segment S3 in which the focus level is decreasing may be displayed, for example, in a cool color. Further, by varying strength of the color of the frame displayed in the cool color in accordance with a variation rate of the focus level, it is possible to comprehend at a glance the state of the variation rate of the focus level. For example, in a region in which a portion where the focus level is decreasing is near the local maximum, the frame may be displayed in blue. For example, in a region in which a portion where the focus level is decreasing is farther from the local maximum, the color of the frame may be changed to light blue.

The series of displays with the use of frames are performed when the focus level varies in some ways. Therefore, for example, when the user stops the focus adjustment operation and the focus level has not varied for a certain period, the displays with the use of frames are removed, and only the subject 22 is displayed on the shooting image screen 22 on the monitor 8 as shown in FIG. 2.

Figure 6:
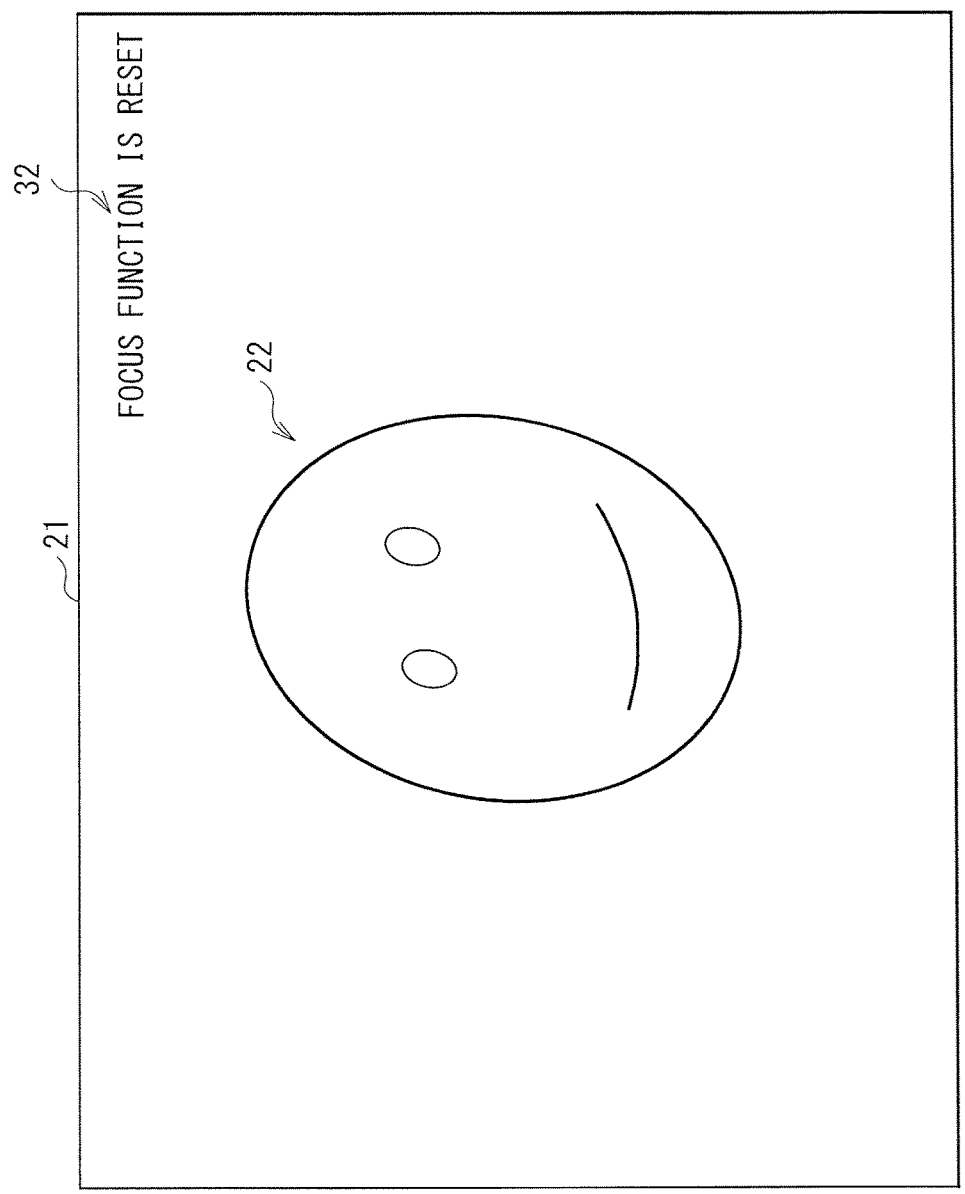
FIG. 6 is an explanation diagram illustrating a notification example in a case where display of information in accordance with the variation amount of the focus level is reset.

The calculation of the variation amount of the focus level by the calculation section 6A may be automatically reset, for example, in a case where the user performs a precipitous focus adjustment operation and the adjustment amount per unit time of the focus adjustment operation becomes equal to or larger than a predetermined value, in a case where continuity in the focus level is lost due to precipitous variation in the subject 22, etc. In this case, words or an icon display that notifies that the calculation of the variation amount of the focus level has been reset may be displayed. The display processing section 7 may allow, for example, the notification 32 using a sentence such as "focusing function is reset" to be performed in the shooting image screen 22 on the monitor 8 as shown in FIG. 6.

[2-4. Automatic Manual Focus Shooting Mode]

The focus adjustment operation is allowed to be assisted in the manual focus shooting mode by performing information display in accordance with the variation amount of the focus level as described above. It is possible to further achieve application in the present embodiment that automatic shooting operation is performed when the region instruction section 10C determines that the focus level of the segment 31 in the determination region designated by the user is at the local maximum in the manual focus shooting mode.

FIG. 7 shows a specific example thereof. In the example shown in FIG. 7, the position of the focus lens 2 at the time of starting the focus adjustment operation is at FP1, which causes a largely-defocused state. The focus lens 2 is allowed to travel from such a state to an optimum focus position. At that time, the focus level is calculated and also an amount (D1 to D6) of variation from the last calculation is calculated. The determination section 6B determines that the focus level is at the local maximum when the variation amount of the focus level which has been increasing is changed to decrease and becomes equal to or smaller than a certain threshold. In the example shown in FIG. 7, the focus level is at the local maximum when the position of the focus lens 2 is at FP6. The recording section 6C performs an automatic recording operation of the shooting image in the recording medium 13 when the determination section 6B determines the local maximum value of the focus level.

Figure 8:
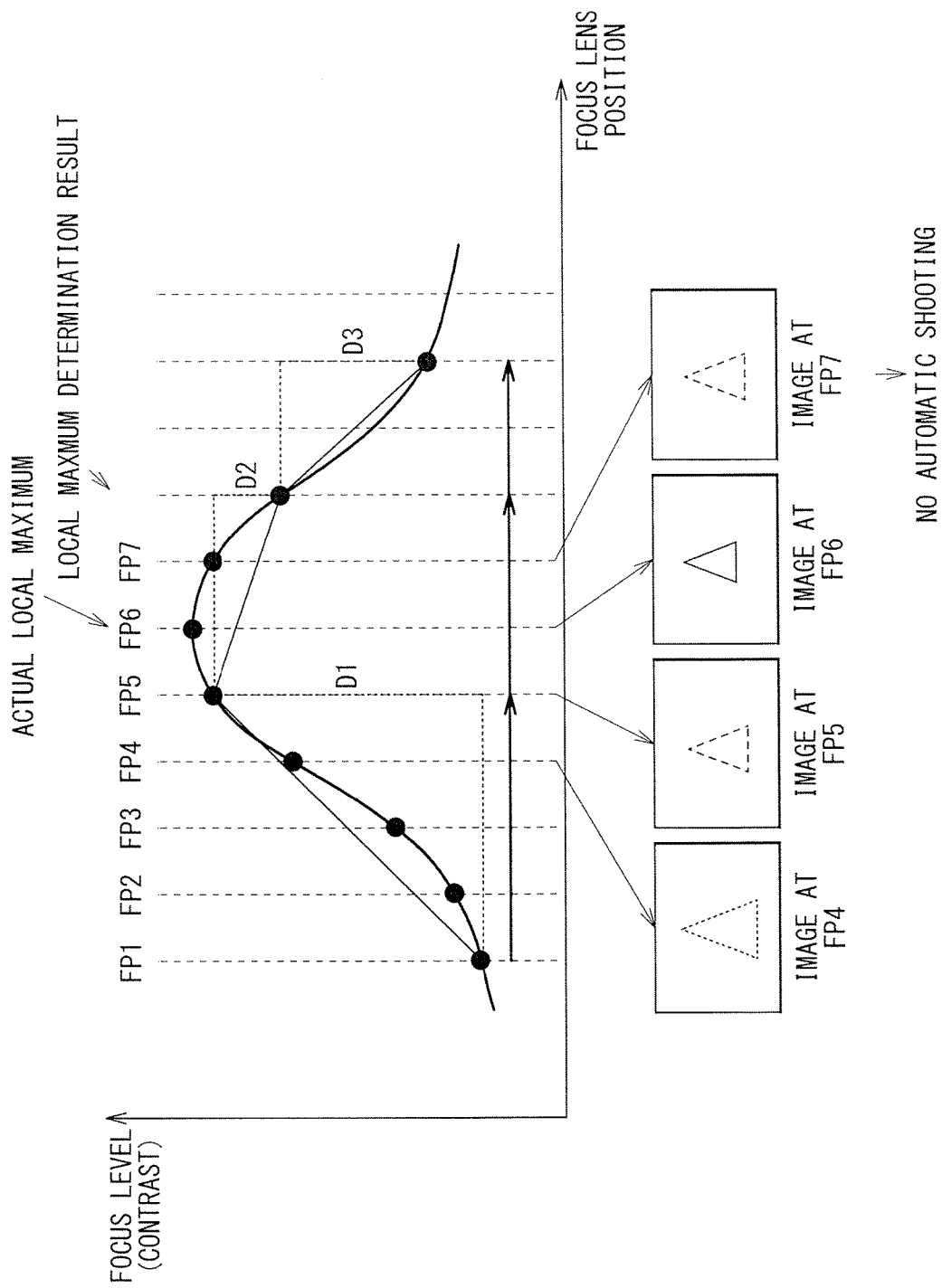
FIG. 8 is an explanation diagram illustrating a second example of a relationship between a position of a focus lens and the variation amount of the focus level.

In any system that is capable of detecting the position of the focus lens 2, the determination section 6B is allowed to determine the local maximum by the control described above. However, in the case of a system that is not capable of detecting the position of the focus lens 2, the variation amount of the focus level may be calculated by every certain time period. In this case, for example, as shown in FIG. 8, an accurate position of the focus lens 2 at the time when the focus level is at the local maximum may not be detected in some cases when the focus adjustment operation is performed excessively fast. Therefore, the recording section 6C may be configured not to perform the automatic shooting operation even if the conditions for the determination section 6B to determine the local maximum are satisfied in a case where the variation amount of the focus level is equal to or larger than a predetermined threshold (a second threshold). Thus, it is avoidable to record an unnecessary image in the recording medium 13.

When the automatic shooting operation is performed by the recording section 6C, the display processing section 7 may allow an icon, words, etc. that notifies that the automatic shooting operation is performed to be displayed on the shooting image screen 22 on the monitor 8. Thus, it is possible to notify the user that the apparatus has not operated wrongly.

[2-5. Method of Displaying Shooting Image]

When the user selects the reproduction mode in which the shooting image recorded in the recording medium 13 is reproduced, whether or not the shooting image shot in the above-described automatic shooting operation is displayed may be switched by menu setting.

FIG. 9 illustrates a display example of a reproduction image screen 41 displayed on the monitor 8 in a reproduction mode. In an upper part of FIG. 9, a plurality of shooting images 42 recorded in the recording medium 13 are displayed in a list. In the upper part of FIG. 9, automatic shooting images 45 that have been automatically shot as described above are set not to be displayed, and only the user shooting images 43 that have been manually shot by the user are displayed in the list.

The recording section 6C associates the manually-shot user shooting image 43 with the automatically-recorded automatic shooting image 45 to store the images in the recording medium 13. As an example of associating the images, for example, a group of automatic shooting images shot after the user has manually shot an image for the previous time and an image manually shot by the user next may be handled as images belonging to the same group.

Even in a case where the automatic shooting images 45 are set not to be displayed as shown in the upper part of FIG. 9, when the automatic shooting images 45 associated with the user shooting image 43 exist, the display processing section 7 allows the monitor 8 to perform display that notifies such a state. For example, as shown in the upper part of FIG. 9, notification with the use of the icon 44 may be performed. Thus, browsing properties are improved and the user is allowed to browse the automatic shooting images 45 as necessary, for example, as shown in a lower part of FIG. 9. For example, when the user selects the user shooting image 43 on which the icon 44 is displayed, the automatic shooting images 45 associated therewith are displayed at the same time.

[3. Effects of Imaging Apparatus]

As described above, according to the present embodiment, information in accordance with the variation amount of the focus level of the shooting image is displayed on the monitor 8 together with the shooting image screen 21. Therefore, it is possible to easily comprehend the focus state and to easily obtain a favorable shooting image.

Specifically, following effects are achieved:

1. By performing display so that the color of the frame of the segment 31 be changed in accordance with the variation amount of the focus level, the user is allowed to intuitively comprehend the blur state of each region in the shooting image screen 21 without moving his or her sight.
2. Display of information is performed by varying the color of the frame, by allowing the frame to blink, etc. Therefore, the edge region is not hidden as in peaking display, and the blur state of the original image is allowed to be comprehended directly.
3. The display with the use of frames is performed only when the focus level is varied. Therefore, display of complicated information is allowed to be reduced to the minimum.
4. The direction of variation is comprehended based on the color of the frame. Therefore, speed, in particular, of recovering from a largely-blurred state to an optimum focus state is fast.
5. By determining the local maximum of the focus level and by performing the automatic shooting operation, shooting images recommended by the apparatus are recorded in case even in the manual focus shooting mode.
6. By providing a mechanism to suppress the automatic shooting operation based on operation speed (the variation amount of the focus level) of the focus adjustment operation, unnecessary automatic shooting images are reduced.
7. By associating the user shooting image with the automatic shooting image, browsing properties and searching properties of the shooting images are improved.

[4. Other Embodiments]

The technology according to the present disclosure is not limited to the description above of an embodiment, and may be variously modified.

Figure 10:
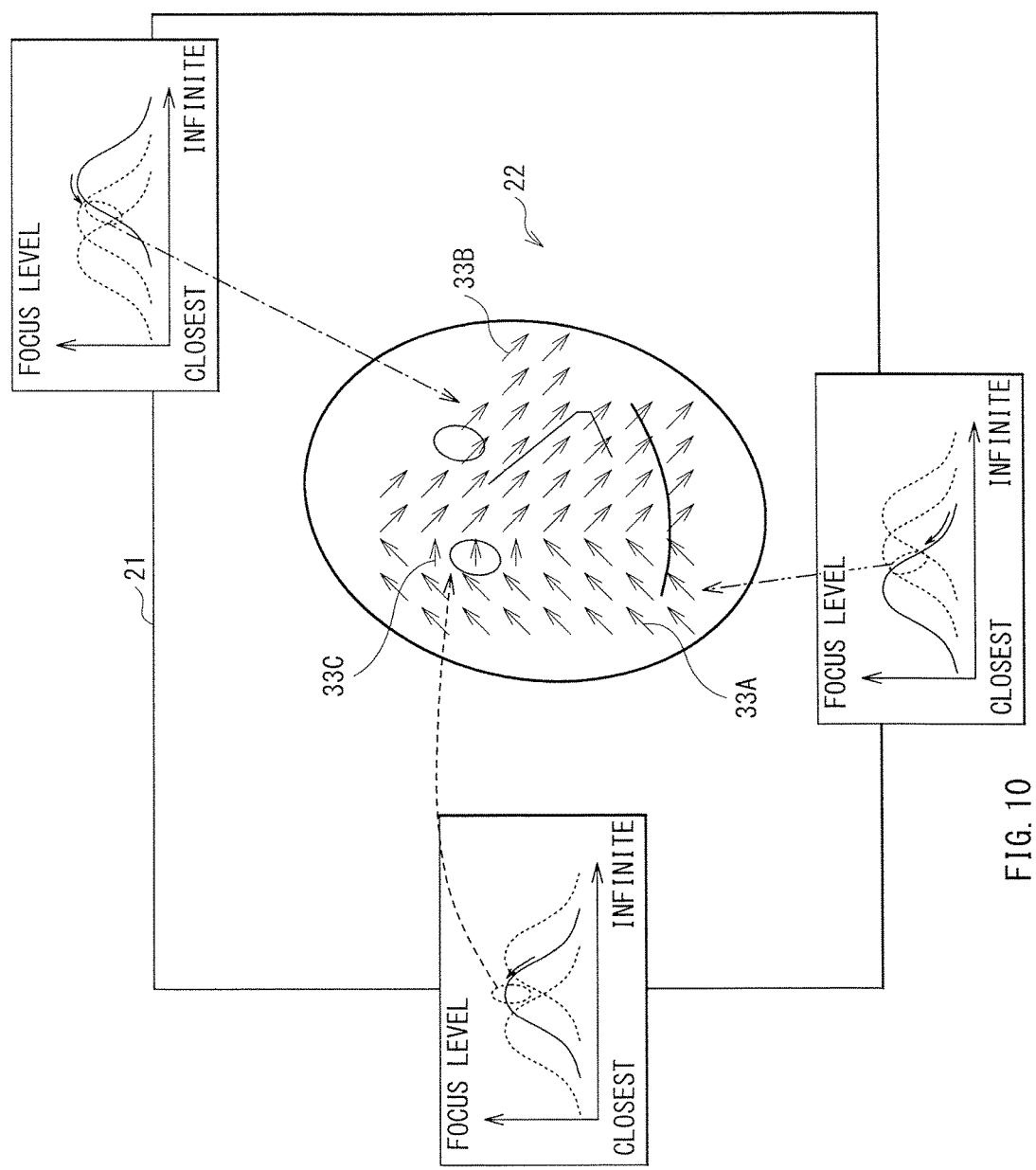
FIG. 10 is an explanation diagram illustrating a modification of display of information in accordance with the variation amount of the focus level.

For example, the display of the information in accordance with the variation amount of the focus level is not limited to the display with the use of frames shown in FIG. 5. For example, as shown in FIG. 10, display with the use of arrows may be performed in accordance with the variation amount of the focus level. In the display example shown in FIG. 10, an oblique upward arrow 31A is displayed in a region in which the focus level is determined to be increasing, and an oblique downward arrow 31B is displayed in a region in which the focus level is determined to be decreasing. An horizontal arrow 31C is displayed in a region in which the focus level is determined to be at the local maximum.

Moreover, the present technology may achieve following configurations, for example:

(1) An imaging apparatus including:

an imaging section having a focusing function, the imaging section being configured to generate a shooting image based on a subject and to output the generated shooting image;

a calculation section configured to calculate a variation amount of focus level of the shooting image generated by the imaging section; and a display control section configured to allow a shooting image screen based on the shooting image and to allow information in accordance with the variation amount of the focus level calculated by the calculation section to be displayed on a display section.

(2) The imaging apparatus according to (1), wherein
the calculation section divides part or all of a region of the shooting image into a plurality of regions, and calculates the variation amount of the focus level for each of the plurality of regions, and
the display control section allows the information in accordance with the variation amount of the focus level for each of the plurality of regions to be displayed on the display section.

(3) The imaging apparatus according to (2), wherein the display control section allows the plurality of regions to be displayed with use of frames in the shooting image screen, and varies a display state of display with the use of the frames in accordance with the variation amount of the focus level.

(4) The imaging apparatus according to any one of (1) to (3), further including
a focus instruction section configured to instructing the imaging section to perform a focus adjustment operation, wherein
the calculation section resets calculation of the variation amount of the focus level when an adjustment amount per unit time of the focus adjustment operation instructed by the focus instruction section is equal to or larger than a predetermined value.

(5) The imaging apparatus according to (4), wherein, when the calculation of the variation amount of the focus level has been reset, the display control section allows the display section to perform display that notifies that the calculation of the variation amount of the focus level has been reset.

(6) The imaging apparatus according to any one of (1) to (5), wherein, when the variation amount of the focus level is equal to or smaller than a first threshold for a predetermined period or more, the display control section allows no the information to be displayed.

(7) The imaging apparatus according to any one of (1) to (6), further including:
a determination section configured to determine a local maximum value of the focus level based on the variation amount of the focus level; and
a recording section configured to perform an automatic recording operation of the shooting image in a recording medium when the determination section determines the local maximum value of the focus level.

(8) The imaging apparatus according to (7), wherein, when the recording section has performed the automatic recording operation, the display control section allows the display section to perform display that notifies that the recording section has performed the automatic recording operation.

(9) The imaging apparatus according to (7) or (8), wherein, when the variation amount of the focus level is equal to or larger than a second threshold, the recording section performs no the automatic recording operation of the shooting image.

(10) The imaging apparatus according to any one of (7) to (9), further including
a determination instruction section configured to instruct a reference value of the variation amount of the focus level, the reference value being used to determine the local maximum value in the determination section, wherein
the determination section changes the reference value, that is used to determine the local maximum value, based on instruction provided from the determination instruction section.

(11) The imaging apparatus according to any one of (7) to (10), further including
a region instruction section configured to designate a determination region in the shooting image screen, the determination region being a region in which the local maximum value of the focus level is determined, wherein
the determination section determines the local maximum value of the focus level based on the variation amount of the focus level in the determination region designated by the region instruction section.

(12) The imaging apparatus according to any one of (7) to (11), further including
a recording instruction section configured to instruct a recording operation of the shooting image in the recording medium, wherein
the recording section associates one or more first shooting images with one or more second shooting images based on times at which the one or more first and second shooting images are recorded, the one or more first shooting images being recorded based on instruction provided from the recording instruction section, and the one or more second shooting images being recorded by the automatic recording operation.

(13) The imaging apparatus according to (12), further including
a reproduction instruction section configured to allow either or both of the one or more first shooting images and the one or more second shooting images recorded in the recording medium to be reproduced and displayed on the display section, wherein,
in a case where the one or more first shooting images instructed by the reproduction instruction section are reproduced and displayed on the display section, when the one or more second shooting images associated with the one or more first shooting images exist, the display control section allows the display section to perform display that notifies that the one or more second shooting images associated with the one or more first shooting images exist.

(14) A method of displaying information, the method including:
calculating a variation amount of focus level of a shooting image generated by an imaging section having a focusing function; and
allowing a shooting image screen based on the shooting image and allowing information in accordance with the calculated variation amount of the focus level to be displayed on a display section.

(15) An information processing unit including:
a calculation section configured to calculate a variation amount of focus level of a shooting image generated by an imaging section having a focusing function; and
a display control section configured to allow a shooting image screen based on the shooting image and to allow information in accordance with the variation amount of the focus level calculated by the calculation section to be displayed on a display section.

It should be understood by those skilled in the art that various modifications, combinations, sub-combinations, and alterations may occur depending on design requirements and other factors insofar as they are within the scope of the appended claims or the equivalents thereof.

What is claimed is:
1. An imaging apparatus, comprising:
an imaging device that includes a focus lens, wherein the imaging device is configured to generate an image of a subject; and circuitry configured to:
vary a position of the focus lens from a first position of the focus lens to a second position of the focus lens in a focus adjustment operation;
calculate a variation amount of a focus level of the generated image based on a difference between a first value of the focus level and a second value of the focus level,
wherein the first value of the focus level corresponds to the first position of the focus lens, and the second value of the focus level corresponds to the second position of the focus lens, and
wherein the variation amount of the focus level corresponds to at least one of a speed of variation in the focus level from the first value of the focus level to the second value of the focus level, or a direction of the variation in the focus level;
control a display screen to:
display the generated image; and
display, based on the calculated variation amount of the focus level, a plurality of frames which divides the displayed image into a plurality of regions.

2. The imaging apparatus according to claim 1, wherein the circuitry is further configured to:
calculate the variation amount of the focus level for each of the plurality of regions; and
control the display screen to further display the plurality of frames, based on the calculated variation amount of the focus level for each of the plurality of regions.

3. The imaging apparatus according to claim 1, wherein the circuitry is further configured to vary a display state of the plurality of frames based on the calculated variation amount of the focus level.

4. The imaging apparatus according to claim 3, wherein the variation of the display state corresponds to a change of color of a frame of the plurality of frames based on the calculated variation amount of the focus level.

5. The imaging apparatus according to claim 4, wherein the change of color is based on a variation rate of the focus level.

6. The imaging apparatus according to claim 3,
wherein the variation of the display state corresponds to a frame of the plurality of frames, and
wherein the display screen is configured to cause the frame to blink based on the calculated variation amount of the focus level.

7. The imaging apparatus according to claim 1, wherein the circuitry is further configured to reset the calculated variation amount of the focus level based on an adjustment amount per unit time of the focus adjustment operation that is equal to or larger than a threshold value.

8. The imaging apparatus according to claim 7, wherein the circuitry is further configured to control, based on the reset of the calculated variation amount of the focus level, the display screen to further display a notification.

9. The imaging apparatus according to claim 1, wherein the circuitry is further configured to prevent, based on the calculated variation amount of the focus level that is equal to or smaller than a threshold value for a time period, the display of the plurality of frames on the display screen.

10. The imaging apparatus according to claim 1, wherein the circuitry is further configured to:
determine a local maximum value of the focus level based on the calculated variation amount of the focus level; and
automatically record the generated image in a recording medium based on the local maximum value of the focus level.

11. The imaging apparatus according to claim 10, wherein the circuitry is further configured to control the display screen to further display a notification that the generated image is recorded.

12. The imaging apparatus according to claim 10, wherein the circuitry is further configured to prevent, based on the calculated variation amount of the focus level that is equal to or larger than a threshold value, the automatic record of the generated image.

13. The imaging apparatus according to claim 10, wherein the circuitry is further configured to:
instruct a reference value of the variation amount of the focus level;
determine the local maximum value based on the reference value; and
change the reference value based on the instruction of the reference value.

14. The imaging apparatus according to claim 10, wherein the circuitry is further configured to:
designate a determination region in the displayed image; and
determine the local maximum value of the focus level based on the calculated variation amount of the focus level in the determination region.

15. The imaging apparatus according to claim 10, wherein the circuitry is further configured to:
record a first image in the recording medium;
automatically record a second image; and
associate the first image with the second image based on time instances at which the first image and the second image are recorded.

16. The imaging apparatus according to claim 15, wherein the circuitry is further configured to:
control the display screen to further display at least one of the first image or the second image; and
control the display screen to further display a notification that the second image is associated with the first image.

17. The imaging apparatus according to claim 1, wherein the direction of the variation of the focus level is associated with the variation of the position of the focus lens from the first position to the second position, and wherein the direction of the variation indicates one of an increase in the focus level of the generated image or a decrease in the focus level of the generated image.

18. A method of displaying information, comprising:
varying, in a focus adjustment operation, a position of a focus lens from a first position of the focus lens to a second position of the focus lens, wherein the focus lens is included in an imaging device, and
wherein the imaging device is configured to generate an image;
calculating a variation amount of a focus level of the image based on a difference between a first value of the focus level and a second value of the focus level,
wherein the first value of the focus level corresponds to the first position of the focus lens, and the second value of the focus level corresponds to the second position of the focus lens, and
wherein the variation amount of the focus level corresponds to at least one of a speed of variation in the focus level from the first value of the focus level to the second value of the focus level, or a direction of the variation in the focus level;

displaying the generated image; and displaying, based on the calculated variation amount of the focus level, a plurality of frames dividing the displayed image into a plurality of regions.

19. An information processing unit, comprising:

circuitry configured to:
- vary, in a focus adjustment operation, a position of a focus lens from a first position of the focus lens to a second position of the focus lens, wherein the focus lens is included in an imaging device;
- calculate a variation amount of a focus level of an image generated by the imaging device, based on a difference between a first value of the focus level of the image and a second value of the focus level of the image,
- wherein the first value of the focus level corresponds to the first position of the focus lens, and the second value of the focus level corresponds to the second position of the focus lens, and
- wherein the variation amount of the focus level corresponds to at least one of a speed of variation in the focus level from the first value of the focus level to the second value of the focus level, or a direction of the variation in the focus level;
- control a display screen to:
  - display the generated image; and
  - display, based on the calculated variation amount of the focus level, a plurality of frames which divides the displayed image into a plurality of regions.

* * * * *